(12) United States Patent
Ulrey et al.

(10) Patent No.: US 9,267,464 B2
(45) Date of Patent: Feb. 23, 2016

(54) METHOD AND SYSTEM FOR VACUUM GENERATION

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/266,411

(22) Filed: Apr. 30, 2014

(65) Prior Publication Data

US 2015/0316003 A1   Nov. 5, 2015

(51) Int. Cl.
*F02B 33/44* (2006.01)
*F02M 3/08* (2006.01)

(52) U.S. Cl.
CPC ....................................... *F02M 3/08* (2013.01)

(58) Field of Classification Search
CPC ..... F02D 41/0007; F02D 23/00; F02B 37/18; F02B 37/24; F02B 37/22; F02B 37/186; F02B 33/44
USPC ................ 60/321, 320, 324, 602, 605.1, 611; 123/572, 573, 574, 543, 546, 41.86
See application file for complete search history.

(56) References Cited

U.S. PATENT DOCUMENTS

| | | | | |
|---|---|---|---|---|
| 1,540,144 A * | 6/1925 | Redmond | .......... | F02M 31/0805 123/545 |
| 2,797,674 A * | 7/1957 | Dolza | .................. | F01M 13/022 123/41.86 |
| 3,285,709 A * | 11/1966 | Eannarino | .................. | F01N 3/26 422/114 |
| 4,027,478 A * | 6/1977 | Masaki | .................... | F01N 3/18 60/285 |
| 4,079,715 A * | 3/1978 | Masaki | .................... | F01P 5/00 123/142.5 R |
| 4,534,333 A * | 8/1985 | Slattery | ................ | F02M 31/047 123/545 |
| 4,846,136 A * | 7/1989 | Phillips | .................. | F02B 61/045 123/556 |
| 8,042,335 B2 * | 10/2011 | Pursifull | .................. | F01N 3/055 60/298 |
| 2010/0012103 A1* | 1/2010 | Lewis | .................... | F02M 25/06 123/574 |
| 2011/0033287 A1 | 2/2011 | Lindner et al. | | |
| 2011/0138774 A1* | 6/2011 | Pursifull | ................ | F01N 3/055 60/273 |
| 2011/0138807 A1* | 6/2011 | Ulrey | ........................ | F01N 5/02 60/605.1 |
| 2013/0298882 A1 | 11/2013 | Stabnik et al. | | |

FOREIGN PATENT DOCUMENTS

JP            58165559 A    *   9/1983

* cited by examiner

*Primary Examiner* — Patrick Maines
(74) *Attorney, Agent, or Firm* — Julia Voutyras; Alleman Hall McCoy Russell & Tuttle LLP

(57) ABSTRACT

Various systems and methods are described for reducing motive flow rate through an aspirator. In one example, a method comprises flowing intake air, heated upon passage through an interstitial space of a double wall exhaust system, through an aspirator coupled to an engine vacuum consumption device to reduce motive mass flow rate at the aspirator as exhaust temperature increases. A position of an intake throttle may be adjusted based on the motive flow rate from the aspirator.

19 Claims, 7 Drawing Sheets

METHOD AND SYSTEM FOR VACUUM GENERATION

FIELD

The present invention relates to reducing motive flow through an aspirator coupled to an engine intake to improve idle speed air control.

BACKGROUND/SUMMARY

Vehicle systems may include various vacuum consumption devices that are actuated using vacuum. These may include, for example, a brake booster. Vacuum used by these devices may be provided by a dedicated vacuum pump. In still other embodiments, one or more aspirators (alternatively referred to as ejectors, venturi pumps, jet pumps, and eductors) may be coupled in the engine system that may harness engine airflow and use it to generate vacuum. For example, when incorporated in an engine intake system, aspirators may generate vacuum using energy that would otherwise be lost to throttling.

Since aspirators are passive devices, they provide low-cost vacuum generation when utilized in engine systems. An amount of vacuum generated at an aspirator can be controlled by controlling the motive airflow rate through the aspirator. While aspirators may generate vacuum at a lower cost and with improved efficiency as compared to electrically-driven or engine-driven vacuum pumps, their use in engine intake systems has traditionally been constrained by both available intake manifold vacuum and maximum throttle bypass flow. Some approaches for addressing this issue involve arranging a valve in series with an aspirator, or incorporating a valve into the structure of an aspirator. Such valves may be referred to as aspirator shut-off valves (ASOVs). An opening amount of the valve is controlled to control the motive airflow rate through the aspirator, and thereby control an amount of vacuum generated at the aspirator, as well as controlling the amount of air flowing past the aspirator into the intake manifold.

However, the use of an ASOV leads to increased component cost and weight. In addition, there may be reliability issues associated with the use of an ASOV. To confirm the proper functionality of the ASOV, intermittent diagnosing of the ASOV is required, adding control complexity. Further still, in engine systems operating with an ASOV, the engine controller is required to be aware of the airflow rate through the ASOV, adding further control burden to the system. The inventors herein have recognized that if the motive mass flow rate through the aspirator were sufficiently reduced, dependence on an ASOV for controlling flow through the aspirator could also be reduced. For example, the ASOV could be eliminated. The inventors have further recognized that motive mass flow rate through the aspirator can vary based on a temperature of the aircharge flowing through the aspirator. Thus in one example, a method for operating an engine is provided, comprising: flowing intake air, heated upon passage through an interstitial space of a double wall exhaust system, through an aspirator coupled to an engine vacuum consumption device to reduce motive mass flow rate at the aspirator as exhaust temperature increases. In this way, heated intake air can be used during idle conditions to reduce a motive mass flow rate through an intake aspirator, while also reducing airflow errors across an intake throttle.

As an example, during an engine cold-start, intake air may be flowed from upstream of an intake throttle, through an interstitial space of an exhaust manifold, and then through an aspirator before being delivered to the intake manifold, downstream of the intake throttle. The aspirator may be un-valved. A position of the throttle may be adjusted based on operating conditions, such as torque demand. The throttle position may additionally be feed-forward adjusted to compensate for aspirator leakage mass flow (that is, air flowing through the aspirator). As such, this may be considered a leak around the throttle valve. At low exhaust temperature conditions, the temperature of air flowing through the aspirator (the motive flow) may be lower, and aspirator motive mass flow rate may be higher. During such conditions, the throttle may be moved to a more closed position to achieve a desired net mass flow rate. As the exhaust temperature increases, the intake air reaching the aspirator via the interstitial spaces may be heated. As the motive flow temperature increases, the motive mass flow rate may decrease. Thus, as the engine warms up, the throttle may be moved to a more open position, all other things being equal. However, as the engine warms up, the idle air mass airflow rate is reduced, resulting in a greater portion of the idle air being warmed serendipitously. By adjusting flow conditions such that these two effects are able to substantially offset each other, the same throttle angle would be able to satisfy both conditions, and a throttle angle can be maintained during airflow control. Herein, the heated, less dense air would serve to give the requisite lower net mass flow needed by a warmed up idling engine. In addition, the throttle position may also be feedback adjusted based on deviations between the expected airflow and the actual airflow following any leakage compensation.

In this way, by heating air delivered to the engine via an aspirator, a motive mass flow rate can be decreased, reducing the mass flow rate into the engine below which the throttle cannot achieve. By enabling the throttle to be held less closed during idling conditions, the error state of allowing too much air mass rate at idle is lessened and the reliance on spark retard for idle speed control is also reduced. In this way, idle speeds can be maintained while drawing vacuum at an aspirator and without reducing fuel economy. In addition, the heated air exhausted into the intake manifold may reduce icing of the air and crankcase plumbing during engine cold starts. By using changes in motive flow temperature to control a motive mass flow rate, the need for a dedicated ASOV for motive flow control is reduced, providing component and cost reduction benefits.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
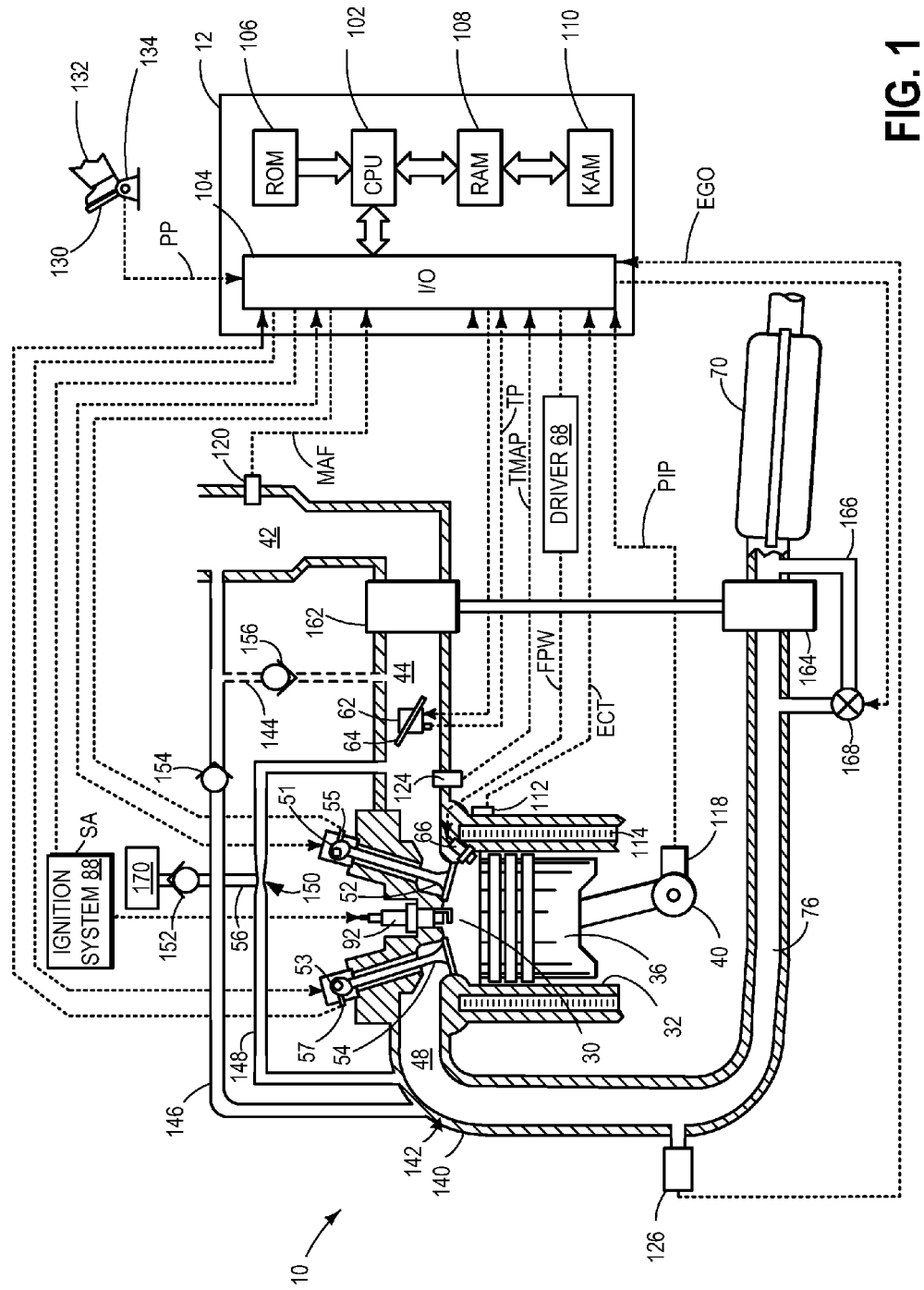
FIG. 1 shows a schematic diagram of an example engine in accordance with embodiments of the present disclosure.
Figure 5:
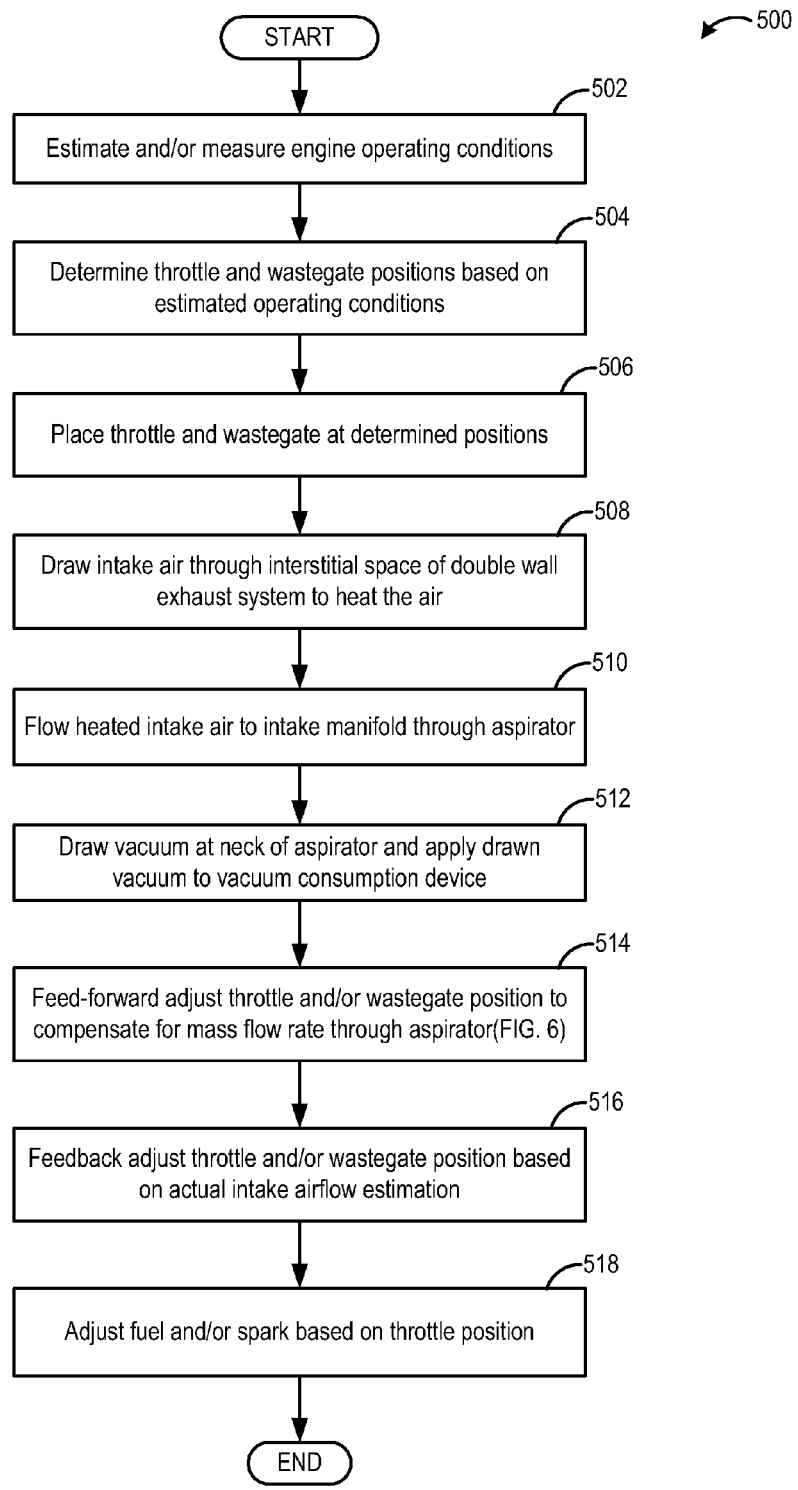
FIG. 5 illustrates a high level flow chart of a method of delivering heated intake air to an intake manifold via an aspirator while compensating for airflow errors.
Figure 6:
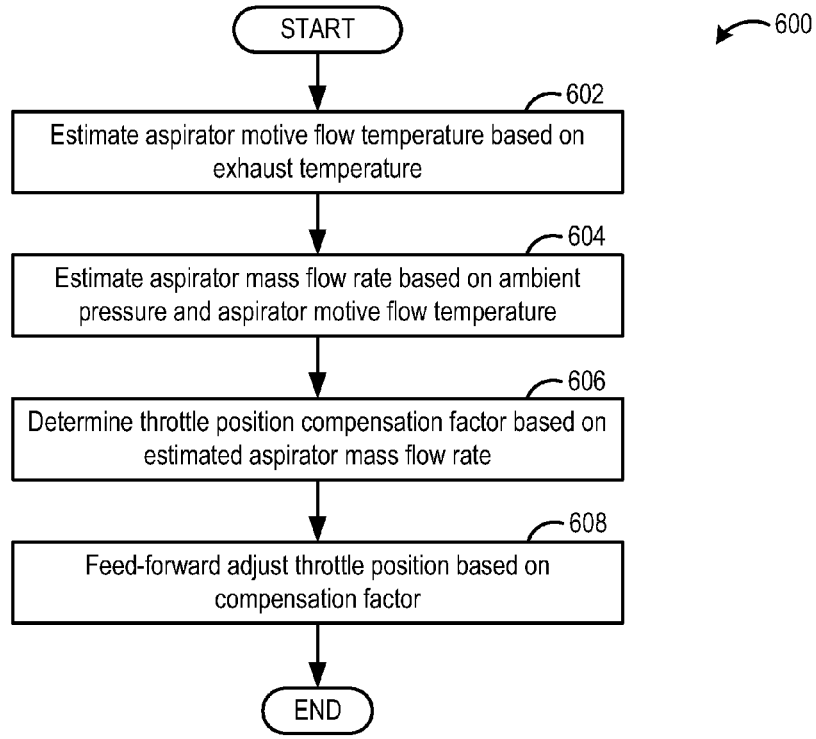
FIG. 6 shows a high level flowchart for feed-forward adjusting a throttle position based on a temperature of motive flow through an aspirator to compensate for airflow through the aspirator.
Figure 7:
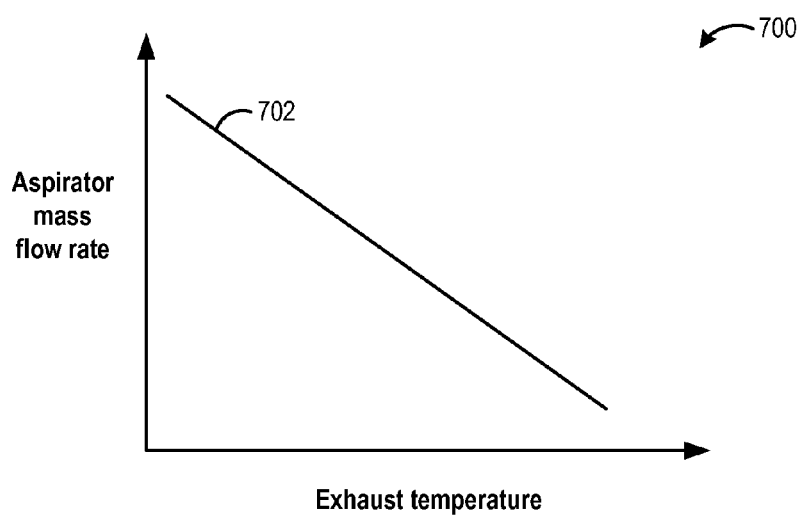
FIG. 7 shows an example relationship between exhaust temperature and aspirator mass flow rate.
Figure 8:
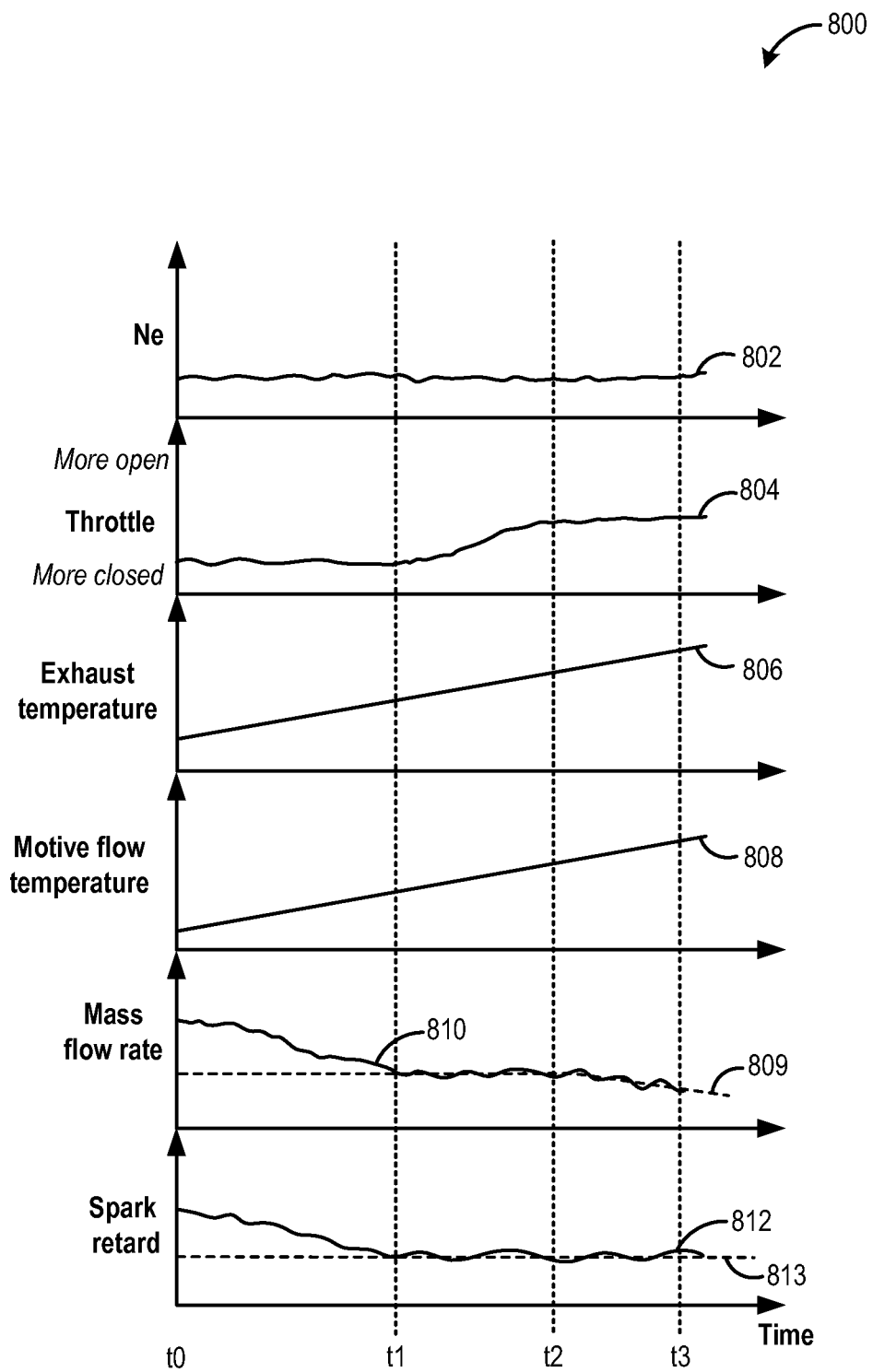
FIG. 8 shows an example throttle adjustment according to the present disclosure.

Methods and systems are provided for reducing motive mass flow rate through an aspirator using air from an intake of an engine, such as the engine system shown in FIG. 1. Heat from exhaust gases may warm intake air as it is circulated through an interstitial space of a double wall exhaust system, such as the exhaust system shown in FIGS. 2-4. The relationship between a mass flow rate of motive airflow through the aspirator and the temperature of the motive flow (FIG. 7) may be leveraged to decrease aspirator mass flow rate. A controller may be configured to perform a routine, such as the example routine of FIG. 5, to adjust a position of an intake throttle and a wastegate to compensate for airflow errors resulting from variations in motive airflow from the aspirator (FIG. 5). Adjustments to the throttle position may be based on an estimated mass flow rate from the aspirator (FIG. 6). In alternate embodiments, such as where a reliable mass flow rate estimate cannot be provided, throttle adjustments may be made based on a combination of pressure, temperature, and a priori knowledge of how mass flow rate changes with these functions. Essentially, the volume flow rate may be predicted based on pressure difference alone and the mass flow rate can be computed from the volume flow rate if a temperature estimate is available. An example adjustment of the throttle is shown in FIG. 8. The controller may be further configured to perform a diagnostic routine, such as the example routine of FIG. 9, to use the heating of intake air via the interstitial space to determine if the interstitial line is plugged.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 76. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 124 for providing respective signals MAF and MAP to controller 12. In the depicted embodiment, sensor 124 is a TMAP sensor configured to provide an estimate of MAP and intake manifold aircharge temperature to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 76 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 76 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake passage 42. For a turbocharger, compressor 162 may be at least partially driven by a turbine 164 (e.g. via a shaft) arranged along exhaust passage 76. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A wastegate 168 may be coupled across turbine 164. Specifically, wastegate 168 may be included in a bypass 166 coupled between an inlet and outlet of turbine 164. By adjusting a position of wastegate 168, an amount of boost provided by the turbine may be controlled.

FIG. 1 further shows exhaust manifold 48 having a double wall exterior 140 defining an interstitial space 142 through which air may flow. The interstitial space may be manufactured similar to that of a liquid space. Conduit 146 is shown connecting the interstitial space 142 to the intake passage 42 upstream of compressor 162 via check valve 154. As such, intake air may be drawn from intake passage 42 via conduit 146 to interstitial space 142 where intake air may be heated via heat transfer from exhaust gases flowing through exhaust manifold 48. Check valve 154 prevents the flow of air from interstitial space 142 into intake passage 42. An optional passage 144 may draw intake air from downstream of compressor 162 and charge air cooler (not shown) during boosted conditions. Optional passage 144 may include check valve 156 to ensure unidirectional flow of intake air from intake manifold 44 to interstitial space 142.

Heated air may exit interstitial space 142 via aspirator passage 148. Aspirator 150 is coupled to aspirator passage 148 and vacuum may be drawn at the neck of aspirator 150 and applied to vacuum consumption device 170 via a check valve 152 located in passage 56. Vacuum consumption device 170 may include one of a brake booster, a fuel vapor canister, and a vacuum-actuated valve (such as a vacuum-actuated wastegate), as non-limiting examples. Aspirator 150 is unvalved and an aspirator shut-off valve (ASOV) is not included in aspirator passage 148. As elaborated herein, motive flow through the aspirator is adjusted by varying a temperature of the motive flow. By reducing the need for a dedicated ASOV for controlling motive flow, component and cost reduction is achieved. However, in alternate embodiments, an aspirator shut-off valve may be included.

Aspirator passage 148 opens into intake manifold 44 downstream of throttle 62 and upstream of intake valve 52. Thus, a portion of intake air may flow from upstream of compressor 162 and throttle 62, through interstitial space 142, via aspirator 150 into intake manifold 44 downstream of throttle 62. A temperature sensor, 124, may be coupled to intake manifold 44, downstream of the aspirator passage 148 to measure a temperature of intake air received from intake passage 42 and aspirator passage 148. In particular, the temperature sensor may sense a temperature of a mixture of cooler intake air received via the throttle and warmer intake air received via the aspirator. Based on the proportion of intake air that is delivered to the intake manifold through the interstitial space, the temperature of airflow in the intake manifold may vary (e.g., the temperature may increase as the proportion of air routed via the interstitial space and then the aspirator increases). In other embodiments, a TMAP (temperature manifold absolute pressure) sensor may be used to measure each of a temperature and pressure of the aircharge mixture received from intake throttle 62 and aspirator 150. As elaborated at FIG. 9, deviations between the estimated intake aircharge temperature and the expected temperature may also be used to diagnose plugging of conduit 146. As elaborated at FIG. 9, if the Throttle Charge Temperature (TCT) is substantially identical with Manifold Charge Temperature (MCT), and if the throttle airflow rate is similar to the aspirator flow rate, and if the exhaust manifold is hot, then heated air is not being received. Restating, if the throttle airflow rate is low and the exhaust manifold is hot, then the MCT will show that the temperature of the combined flow is greater than the temperature of the throttle air. More details of the double walled system and aspirator will be elaborated below in the description for FIG. 5.

Controller 12 is shown in FIG. 1 as a microcomputer, including microprocessor unit 102, input/output ports 104, an electronic storage medium (or non-transitory memory) for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; intake air temperature via temperature sensor 124 or a TMAP sensor; and throttle position (TP) from a throttle position sensor. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below, such as at FIGS. 5 and 6, as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
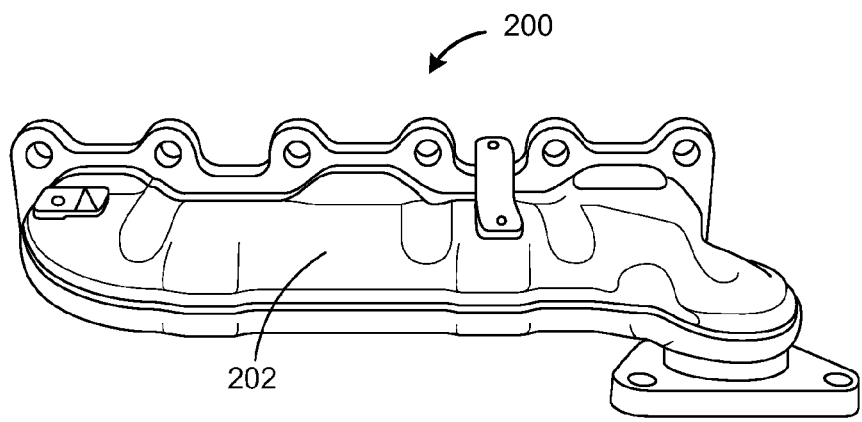
FIG. 2 portrays a schematic depiction of an example double wall exhaust manifold.
Figure 3:
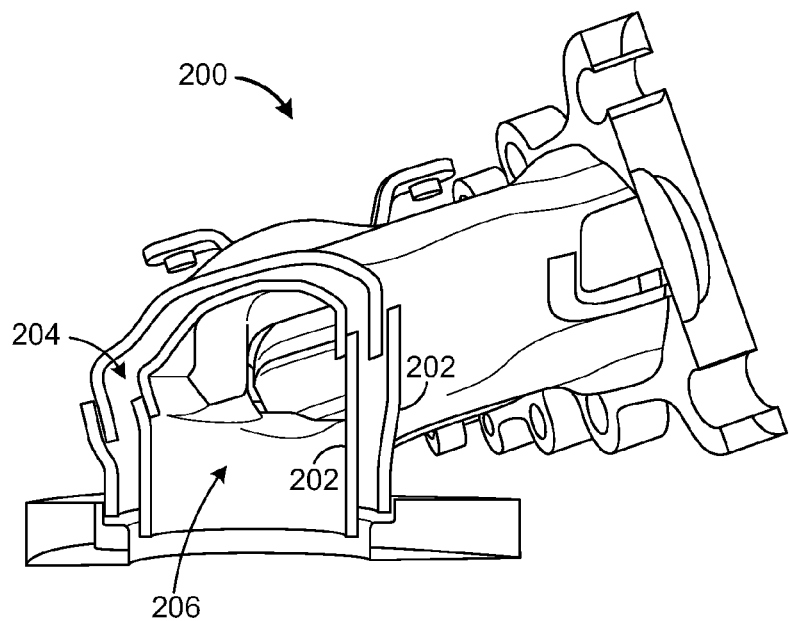
FIG. 3 shows a schematic depiction of a cross-section of the double wall exhaust manifold of FIG. 2.

Turning now to FIG. 2, it shows an example exhaust manifold 200 having a double wall exterior 202. FIG. 3 shows a cross-section of exhaust manifold 200 from FIG. 2, illustrating the interstitial space 204 of the double wall exterior through which intake air may flow. It should be appreciated that interstitial space 204 is distinct from the inner cavity 206 of exhaust manifold 200 through which exhaust gas may flow. Thus, intake air flowing through interstitial space 204 may be heated via heat transfer from hot exhaust gases flowing within inner cavity 206.

Figure 4:
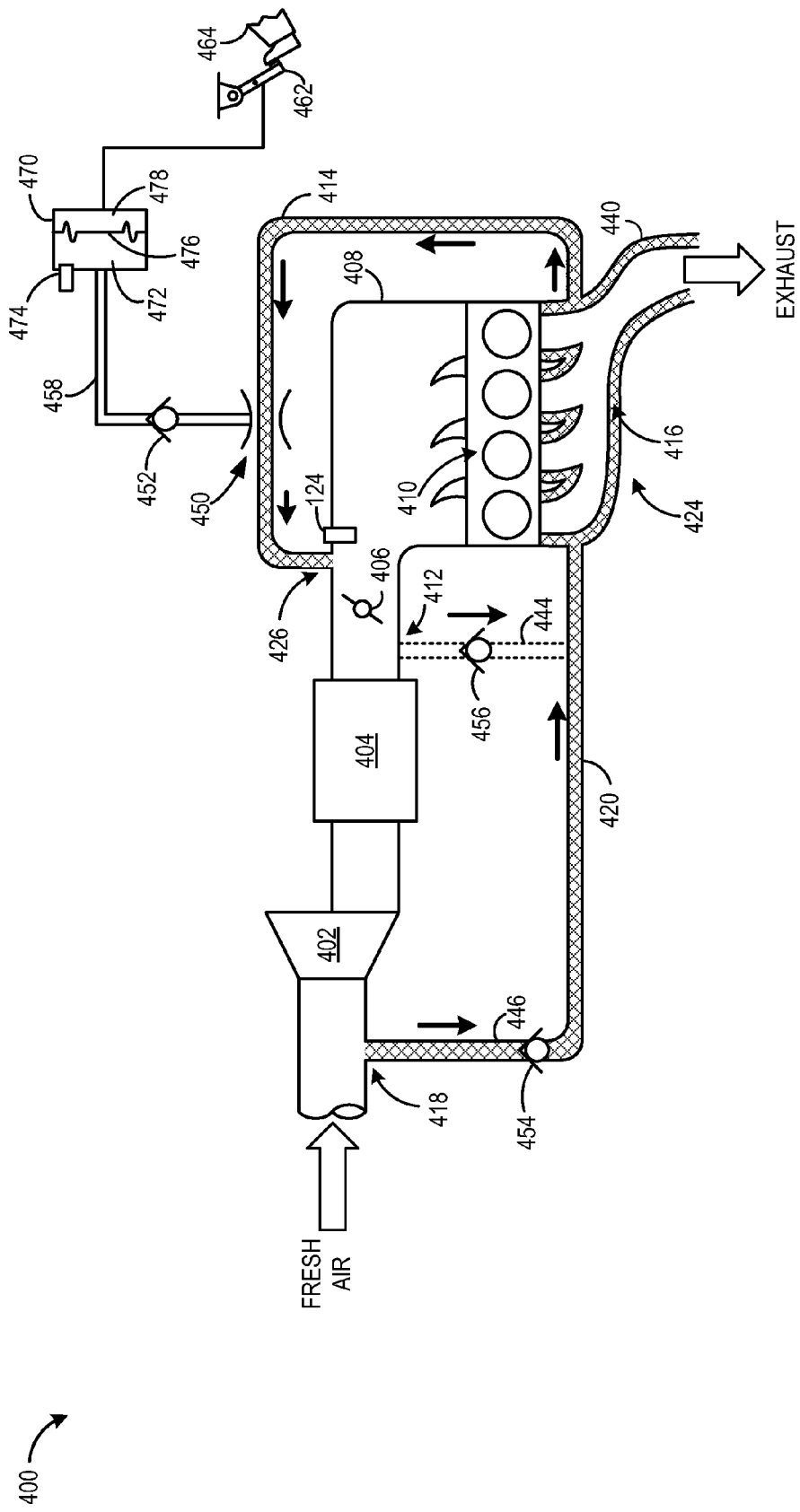
FIG. 4 represents a schematic depiction of intake air heating via a double wall exhaust manifold.

FIG. 4 shows an example of intake air heating via a double wall exhaust manifold 440 (shown as a cross-section). In the depicted example, a larger portion of fresh intake air typically flows through a compressor 402 and a charge air cooler 404 before being adjusted via a throttle 406, based on engine operating conditions, and flowing into an intake manifold 408. Intake air is then fed from the intake manifold 408 into cylinders 410 for combustion with fuel. Exhaust gas from the combustion is then output to exhaust manifold 440. Exhaust manifold 440 is composed of a double wall exterior defining interstitial space 416, as elaborated previously at FIGS. 2-3.

A smaller portion of fresh intake air may also flow into conduit 420 from upstream of throttle 406. Intake air may be drawn into conduit 420 from upstream of compressor 402 at opening 418 via a first passage 446. Additionally, or optionally, intake air may be drawn into conduit 420 from an opening 412 positioned downstream of charge air cooler 404 via a second passage 444. For example, when the engine's boosting device is not enabled, and the engine is operating under non-boosted conditions, the intake manifold pressure may be less than ambient pressure. Therefore, intake air may flow into first passage 446 via opening 418 and thereon into conduit 420 from upstream of compressor 402. In another example, when the engine's boosting device is enabled and the engine is operating under boosted conditions, intake manifold pressure may be higher than ambient pressure and intake air may be drawn into second passage 444 via opening 412 downstream of charge air cooler 404 and thereon into conduit 420. Check valve 454 in first passage 446 and check valve 456 in second passage 444 ensure that airflow is unidirectional and continually flowing from the intake passage into interstitial space 416 of exhaust manifold 440.

Intake air drawn into conduit 420 may flow into interstitial space 416 where it may be heated by the surfaces of the double wall exhaust manifold 440 via heat transfer from exhaust gases, as indicated at 424. The heated air may then flow into conduit 414, through aspirator 450, in a direction toward intake manifold 408. Finally, the heated air may enter intake manifold 408 at 426 downstream of throttle 406. As such, the heated air is then sourced into the intake manifold 408. It will be appreciated that aspirator 450 is un-valved and not coupled to an aspirator shut-off valve (ASOV) in this embodiment.

As such, motive mass flow rate through an aspirator is affected by a temperature of air flowing through the aspirator. In particular, motive mass flow rate through the aspirator decreases as the motive flow temperature increases. The inventors herein have recognized that by using intake air that has been heated upon passage through the interstitial spaces of an exhaust manifold, the temperature of motive flow through the aspirator can be increased, decreasing the motive mass flow rate. Since the intake air is heated via heat transfer across the interstitial space of the exhaust manifold, the motive flow temperature, and thereby the motive mass flow rate, can be inferred based on exhaust temperature. For example, as the exhaust temperature increases, the motive flow temperature may also increase, and the motive flow rate through the aspirator may correspondingly decrease. By controlling motive flow rate via adjustments to motive flow temperature, the need for a dedicated ASOV for motive flow control is reduced. For example, as shown in the depicted embodiment, the ASOV may be eliminated.

In some examples, during boosted conditions, it may be desired that substantially no heated air be received in the intake via the interstitial space of the exhaust manifold. As such, the aspirator airflow rate is small relative to the total air when the system is boosted; however, if all air heating via the interstitial space is to be avoided, air may be diverted along the second passage 444 to a location upstream of the venturi inlet, while bypass a large portion of the interstitial space.

Alternatively, second passage may be coupled to a condensate collection pan at the bottom of intercooler 404 to route condensate into the interstitial space 416. This converts the condensate to steam which is then ingested by the engine.

As such, when motive mass flow rate through the aspirator is lower due to heating of the motive flow, much of the aspirator suction performance is preserved because the volume flow rate is largely preserved. When the engine is warm, its minimum requisite mass airflow rate is reduced from that when cold. Thus it is serendipitous that the motive air mass flow rate also drops. Conventionally, an ASOV was used to limit mass flow rate during the condition of minimum mass flow rate. Herein, by heating the motive flow through the venturi, an alternative way to limit mass flow is provided. Further, even though mass flow is limited, little to no limiting of volume flow occurs, thus preserving much of the aspirator suction performance. Thus by reducing aspirator motive flow rates through the use of heated intake air, aspirator mass flow may also be reduced. As elaborated herein, based on the estimated mass flow rate of air entering the intake manifold from the aspirator, an intake throttle position may be adjusted to reduce airflow errors during engine operation.

Air flowing through aspirator 450 may create a vacuum for a vacuum consumption device such as a brake booster or a fuel vapor canister, or a vacuum-actuated valve. In the embodiment depicted in FIG. 4, aspirator 450 is coupled to a brake booster 470 coupled to vehicle wheel brakes (not shown). Brake booster 470, including a brake booster vacuum reservoir 472 and a working chamber 478, may be coupled to intake manifold 408 via check valve 452 and aspirator 450. Check valve 452 allows air to flow towards intake manifold 408 from brake booster 470 and limits airflow to brake booster 470 from intake manifold 408. Brake booster 470 may include a vacuum reservoir 472 (or vacuum cavity) behind a diaphragm 476 of the brake booster for amplifying a force provided by a vehicle operator 464 via a brake pedal 462 for applying vehicle wheel brakes (not shown). A vacuum level at brake booster 470 may be estimated by pressure sensor 474. Brake booster 470 works by using a pressure difference across the diaphragm 476. By allowing atmospheric air to enter the working chamber 478, a differential pressure may be formed across diaphragm 476, and a force may be created to assist the force applied to brake pedal 462.

As mentioned in FIG. 1, a temperature sensor 124 may be coupled to intake manifold 408, downstream of aspirator 450 and throttle 406. Temperature sensor 124 may be configured to measure the temperature of intake air received into the intake manifold from downstream of aspirator 450 and throttle 406. In some embodiments, temperature sensor 124 may be configured as a TMAP (temperature manifold absolute pressure) sensor that can provide each of a temperature and pressure estimate of aircharge received in the intake manifold. As such, based on the proportion of intake air received via the throttle relative to intake air received via the aspirator (upon passage through the interstitial space), a temperature of air received in the intake manifold may vary. For example, as the amount of airflow received via the aspirator increases relative to the throttle air, a temperature of the intake aircharge estimated by the temperature sensor may be higher than throttle charge temperature. In addition, since intake air received via the aspirator is heated upon passage through the interstitial space, as the exhaust temperature increases, the temperature of intake air received via the aspirator also increases. An engine controller may thus predict an expected intake manifold aircharge temperature based on exhaust temperature and motive flow through the aspirator. As elaborated herein at FIG. 9, an engine controller may also identify clogging or plugging of interstitial space 416 based on a deviation of the estimated intake aircharge temperature from the expected temperature.

Turning now to FIG. 5, it shows an example routine 500 for adjusting a position of the intake throttle based on airflow from the aspirator. Specifically, the intake throttle position is adjusted based on an estimation of aspirator mass flow rate into the intake manifold. A wastegate position may also be adjusted to compensate for airflow errors.

At 502, engine operating conditions may be estimated and/or measured. Example conditions such as operator torque demand, pedal position, engine speed, MAP, MAF, BP, boost level, vacuum level in a vacuum reservoir coupled to a vacuum consumption device, etc., may be estimated. At 504, initial throttle and wastegate positions may be determined based on the estimated engine conditions. For example, as the operator torque demand increases, the throttle may be shifted to a more open position while the wastegate is shifted to a more closed position. As another example, at engine idling conditions, the throttle may be shifted to a more closed position (e.g., to a fully closed position) while the wastegate is shifted to a more closed position (e.g., a fully open position). At 506, the throttle and wastegate may be commanded to the determined positions.

At 508, a portion of intake air may be drawn into the interstitial space within the double wall exhaust system to be heated by exhaust gases. Depending on engine boost level, the portion of intake air may be drawn from upstream of the compressor or from downstream of the compressor and the charge air cooler. For example, when the engine boost level is higher (or when the engine is operating with boost enabled), intake air may be drawn into the interstitial space from downstream of the compressor. In comparison, when the engine boost level is lower (or when the engine is operating with boost disabled), intake air may be drawn into the interstitial space from upstream of the compressor. While flowing through the interstitial space, the intake air may be heated via heat transfer with the exhaust manifold, the exhaust manifold heated due to flow of hot exhaust gases.

At 510, the method includes flowing intake air, heated upon passage through the interstitial space of a double wall exhaust system, through an aspirator, to reduce mass flow through the aspirator. The aspirator may be coupled to an engine vacuum consumption device. The motive mass flow rate of heated intake air through the aspirator changes based on gas density which is dependent on gas temperature. For example, intake air at a higher temperature may have a lower density and may result in a lower motive mass rate as compared to intake air at a cooler temperature and a higher density. The volume flow rate may be substantially independent of gas temperature.

At 512, intake air flowing through the constriction within the aspirator may generate a vacuum which may be drawn at the neck of the aspirator. Further, the vacuum may be applied to the vacuum consumption device coupled to the aspirator. For example, vacuum generated at the aspirator may be applied to the vacuum reservoir of a brake booster, as shown in FIG. 4.

At 514, the throttle and wastegate positions may be feed-forward adjusted to compensate for mass flow rate through the aspirator (or "aspirator leakage"). In one example, during an engine cold-start and when exhaust gas temperature is lower, the throttle may be feed-forward adjusted to a more closed position to compensate for higher aspirator mass flow rate (due to a higher motive mass rate of cooler, more dense, air through the aspirator). In addition, the wastegate may be feed-forward adjusted to a more open position. In another example, during an idling condition following an engine start, when exhaust gas temperature is higher, the throttle may be feed-forward adjusted to a more open position to compensate for lower aspirator mass flow rate (due to a lower motive mass flow rate of warmer, less dense air through the aspirator). In addition, the wastegate may be feed-forward adjusted to a more closed position.

Adjustments to the throttle position via feed-forward control may be based on a compensation factor learned from an estimated mass airflow rate from the aspirator. FIG. 6 depicts routine 600 for estimating the compensation factor and will be described herein.

At 516, in addition to feed-forward adjusting the throttle and wastegate positions, feedback adjustments may be made to reduce cylinder air charge estimation errors. Specifically, additional adjustments may be performed to throttle and wastegate positions based on deviations between actual intake airflow (as estimated by an airflow sensor) and an expected intake airflow. If an air meter is present, all the engine airflow rate is metered regardless of whether it enters via the throttle or enters via the motive flow rate of the aspirator. If cylinder air charge is metered primarily via manifold pressure, the air charge estimate is not dependent on whether the air enter from the throttle or from the motive flow path of the aspirator. As such, the motive flow mass rate is important for throttle control. The throttle allows the desired air to enter the intake manifold. To do so, a controller needs to know what air has entered from the non-throttle paths, such as crankcase ventilation, fuel vapor purge, aspirator motive flow path, aspirator suction/bypass flow path etc. By recognizing the effect of exhaust warming of the air in the aspirator motive flow path, as described herein, throttle airflow control is improved.

At 518, fuel injection and/or spark timing may be adjusted based on throttle position to provide engine speed control. For example, during engine idling conditions, fuel and/or spark timing may be adjusted based on throttle position to maintain engine idling speed. In one example, if the throttle position is at a limit, such as when the throttle is fully closed, engine idle speed may be maintained by retarding spark timing. As such, if spark timing were not retarded, engine idle speeds may increase. Spark timing may be retarded based on the airflow error, which in turn is based on the aspirator mass flow amount. By using heated intake air as motive flow through the aspirator, airflow through the aspirator leakage is reduced, which allows airflow errors to be compensated for while closing the throttle less often. By reducing the frequency of throttle closing during engine idle speed control, the need for using spark retard to maintain engine idle speed is reduced, improving fuel economy.

Now turning to FIG. 6, an example method 600 is shown for feed-forward adjusting a throttle position based on motive mass flow rate through an aspirator. As such, since motive mass flow rate through the aspirator is based on motive flow temperature, the method allows feed-forward adjusting of throttle position to compensate for aspirator leakage to be varied as a function of motive flow temperature.

At 602, a temperature of motive flow through the aspirator may be inferred based on exhaust temperature. Since the motive mass flow through the aspirator includes intake air heated upon passage through the interstitial spaces of an exhaust manifold, the motive flow temperature varies as the exhaust temperature varies. In particular, at higher exhaust temperatures, more heat may be transferred to intake air flowing though the interstitial spaces, and therefore motive flow temperature may be higher. Thus, the motive flow temperature may be estimated based on the exhaust temperature. Exhaust temperature may be estimated by an exhaust temperature sensor. Alternatively, exhaust temperature may be estimated as a function of engine operating parameters such as engine speed, engine load, amount of spark retard, air-fuel ratio, and the like.

At 604, an aspirator mass flow rate may be estimated based on ambient or barometric pressure, and the motive flow temperature estimated at 602. The aspirator mass flow rate may increase as the barometric pressure increases (or altitude decreases). Since motive flow temperature is related to exhaust temperature, aspirator mass flow rate may be estimated based on exhaust temperature. FIG. 7 demonstrates an example relationship between aspirator mass flow rate and exhaust temperature. Specifically, map 700 shows exhaust temperature plotted along the x-axis and aspirator mass flow rate along the y-axis. Plot 702 shows that as exhaust temperature rises, aspirator mass flow rate decreases, in proportion. At lower exhaust temperatures, intake air in the interstitial space may not be heated to higher temperatures. Cooler air is denser, and therefore, motive mass flow rate through the aspirator is higher. As exhaust temperature increases, intake air is heated to higher temperatures within the interstitial space. Warmer air, being less dense, has a lower mass flow rate. Thus, aspirator mass flow rate is lower at higher exhaust temperatures.

Returning now to routine 600, at 606, a throttle compensation factor may be determined based on the estimated aspirator mass flow rate. The compensation factor may include a factor that reduces the throttle position as the aspirator mass flow rate increases to compensate for the additional air coming in from the aspirator. At 608, the throttle position may be feed-forward adjusted based on the determined compensation factor. For example, as the temperature of motive flow increases and a lower quantity of intake air flows into the manifold as airflow from the aspirator, the compensation factor may adjusted (e.g., increased) so that the throttle may be moved to a more open position. On the other hand, if the temperature of motive airflow through the aspirator decreases, resulting in a higher airflow into the manifold, the compensation factor may be adjusted (e.g., decreased) so that the throttle is moved to a more closed position. In one example, moving the throttle to a more open position may include increasing the throttle angle while moving the throttle to a more closed position may include decreasing the throttle angle. Thus, the throttle position may compensate for motive flow from the aspirator into the intake passage to reduce overfueling that may result from airflow errors.

In this way, a throttle position may be feed-forward adjusted based on an amount of airflow from the aspirator. The amount of airflow may be dependent on the temperature of motive air flowing through the aspirator, which in turn is dependent on exhaust temperatures. For example, at engine idling conditions if motive flow temperature is higher, mass flow rate through the aspirator into the intake manifold may be lower. Therefore, the throttle may be held less closed to maintain engine speed. By using heated motive flow during a wider range of operating conditions, aspirator mass flow rate is reduced, and aspirator efficiency is improved. Lower airflow from aspirator reduces throttle adjustments required to maintain engine idle air and speed control. In particular, the lower aspirator airflow enables the throttle to be operated away from a fully closed position for a longer duration. By reducing the frequency of full throttle closure, the need for spark timing adjustments (such as the use of spark retard) during idle speed control is reduced and thus, fuel economy may be improved.

In another representation, an engine method may include varying a feed-forward adjustment to a throttle position during engine idling based on a temperature of motive flow received in the engine, downstream of the throttle, via an aspirator. Herein, the motive flow may include intake air heated upon passage through an interstitial space of an exhaust manifold, and the motive flow temperature may be inferred based on exhaust temperature. The adjustment may include feed-forward adjusting the throttle to a more open position to compensate for a smaller amount of air received downstream of throttle via the aspirator during higher exhaust temperature conditions, and feed-forward adjusting the throttle to a less open position to compensate for a larger amount of air received downstream of the throttle via the aspirator during lower exhaust temperature conditions. The method may further include feed-forward adjusting the throttle position during engine idling based on the temperature of motive flow until a throttle position limit is reached. Then, after the limit is reached, maintaining the throttle position at the limit, while retarding spark timing based on the motive flow rate. In one example, the throttle position limit includes a fully closed throttle position.

Intake air heating provides still further advantages. For example, fuel economy of the engine is increased by reducing intake stroke pumping work via the raising of the intake manifold charge temperature. As yet another example, engine combustion stability is improved, in particular at light engine loads, with improved exhaust gas recirculation (EGR) and variable cam timing (VCT) benefits. The heating also improves engine oil warm-up, lowering friction and improving fuel economy. Further still, carbon monoxide (CO) emissions of the engine are improved.

An example throttle adjustment is shown with reference to FIG. 8. Specifically, map 800 depicts engine speed at plot 802, throttle position at plot 804, exhaust temperature at plot 806, motive flow temperature at 808, mass flow rate at 810, and spark retard at plot 812. Mass flow rate may be a combination of flow rates of intake air from the throttle and airflow from the aspirator. Map 800 is plotted against time on the X-axis. Line 809 represents a desired airflow rate and line 813 represents maximum brake torque (MBT).

At t0, engine speed (Ne) may be at a lower speed range, e.g. at idle speed. Accordingly, the desired airflow rate may also be low. As a result, the throttle may be held at a more closed (e.g., a fully closed) position. Due to the exhaust temperature being low at t0, the temperature of motive flow received at an aspirator via an interstitial space of the exhaust manifold may also be low. As such, between t0 and t1, as engine operation continues, exhaust temperature, and therefore motive flow temperature, may gradually increase, while remaining below a threshold temperature. Due to the lower motive flow temperature, extra air is received with the actual mass flow rate becoming higher than the desired mass flow rate. The extra air received from the cooler and denser aspirator motive flow may result in additional torque. However, since the throttle may be at its limit of motion (e.g., fully closed position), the actual mass airflow rate may not be reduced via further throttle adjustments. Consequently, the additional torque may be compensated for through the use of spark retard. In other words, the extra air from the dense and cool motive flow rate is compensated by spark retard.

Between t0 and t1, as the exhaust temperature increases, motive flow temperature may also increase resulting in a decrease in actual mass flow rate towards the desired airflow rate (line 809). As the amount of extra air received due to the cool and dense motive flow decreases, the amount of spark compensation of torque required decreases, and the amount of spark retard applied may be gradually decreased. At t1, spark timing may be at or around MBT and the engine may be operating with no spark retard.

Between t1 and t2, engine speed may continue to be at a constant lower speed, such as at idling speed. Further, exhaust temperature and motive flow temperature may continue to rise as engine combustion progresses. The higher motive flow temperature results in a smaller error between actual mass airflow rate and the desired mass airflow rate. Due to the decreased airflow through the aspirator, the throttle may be adjusted to a more open position to maintain mass flow rate at a desired airflow rate. Herein, the extra air from the motive flow rate is compensated by a throttle adjustment from an initially more closed position towards a more open position. In response to the control of airflow by the throttle, spark timing may be maintained close to MBT and no spark retard is required. By reducing the need for spark retard, fuel economy is improved.

Between t2 and t3, engine speed may remain at a lower constant speed, such as at an idle speed. Exhaust temperature and motive flow temperature may continue to increase and may exceed a threshold causing an additional decrease in the mass flow rate through the aspirator. In addition, when the engine is warm, the desired airflow rate may be lower than the desired airflow rate when the engine is cold. Thus, between t2 and t3, the desired mass flow rate may decrease as the exhaust temperature increases. This reduction in desired airflow rate as the engine warms up is serendipitous with the heating of the aspirator's motive air mass flow rate. As a result of the decrease, the throttle may be maintained at a constant moderately open position. Thus between t2 and t3, the mass flow rate may decrease along with the desired airflow rate and there may be substantially no airflow errors. Herein, airflow control is achieved via the heated aspirator flow and without requiring additional throttle or spark adjustments.

In this way, throttle adjustments may be based on aspirator mass flow rate which is more accurately estimated based on motive flow temperature. By using heated intake air to provide motive flow through an aspirator, vacuum is produced at the aspirator while reducing aspirator airflow, and while also reducing the need to maintain the throttle closed. In another representation, the engine method may include determining a feed forward throttle position during engine idling based on an amount of airflow through the aspirator, the amount of airflow estimated based on exhaust temperature during engine warm-up from ambient temperature. The feed forward throttle position may then be adjusted to be more closed at lower exhaust temperatures than at higher exhaust temperatures for a given total airflow to the engine.

Figure 9:
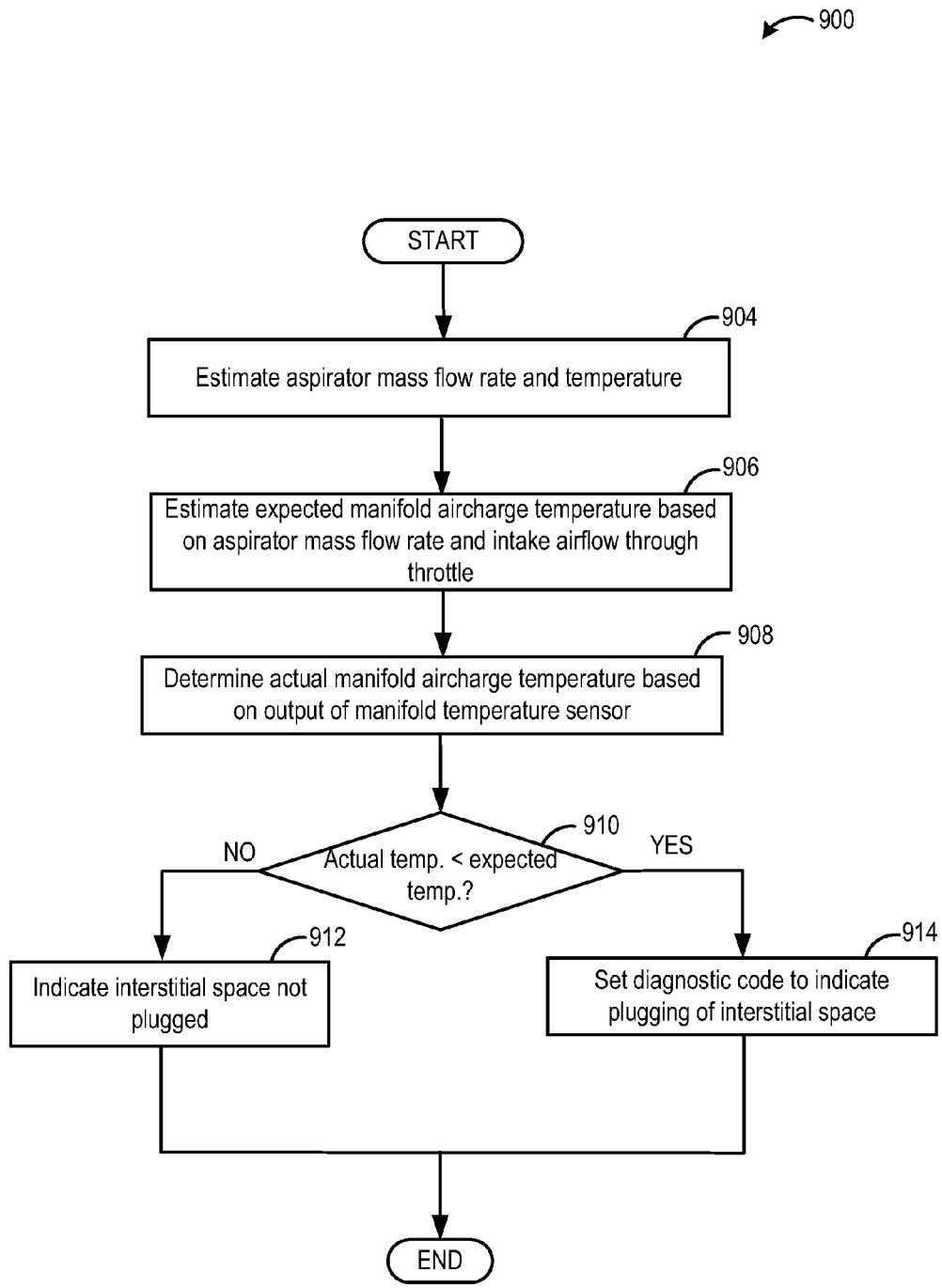
FIG. 9 illustrates a high level flowchart to diagnose plugging of the interstitial space defined within the double walls of the exhaust system.

Turning now to FIG. 9, an example routine 900 for diagnosing plugging of the interstitial space in the double wall exterior of the exhaust system is shown. Specifically, temperature of intake air received into the intake manifold from the throttle and the aspirator is compared to an expected temperature of said air to detect plugging of the interstitial space.

At 904, an aspirator mass flow rate and temperature may be estimated. As elaborated previously, each of the motive mass flow rate and motive flow temperature through the aspirator may be inferred based on exhaust temperature. In particular, as the exhaust temperature increases and more heat is transferred from the exhaust manifold to intake air flowing through the interstitial space of the exhaust manifold, the motive flow temperature may increase and the aspirator mass flow rate may decrease.

At 906, an expected manifold aircharge temperature (MCT) is estimated based on the aspirator mass flow rate and further based on an intake airflow through throttle. In particular, the controller may estimate a temperature of aircharge received in the intake manifold, the received aircharge including a mixture of air received via the throttle and air received downstream of the throttle via the aspirator. For example, during engine idling after the engine has warmed up, the MCT is expected to be hotter (e.g., hotter than coolant temperature TCT) due to hot air received via the involved aspirator.

At 908, the routine includes determining the actual manifold aircharge temperature based on the output of an intake manifold temperature sensor. In one example, a temperature sensor such as the TMAP sensor 124 of FIG. 1 may be used. At 910, the expected manifold charge temperature is compared to the estimated manifold charge temperature to determine if the estimated value is lower than the expected value. In one example, it may be determined if the estimated manifold charge temperature is lower than the expected manifold charge temperature by more than a threshold amount.

If the estimated manifold charge temperature is not lower than the expected manifold charge temperature, at 912 it may be determined that the interstitial space of the exhaust manifold is clear (that is, not clogged or plugged). Else, at 914, if the estimated manifold charge temperature is lower than the expected manifold charge temperature, it may be indicated that the interstitial space of the exhaust manifold is clogged or plugged. For example, a diagnostic code may be set to indicate the clogging. In one example, the interstitial space may be plugged due to dirt or impurities that escape the intake air filter. These impurities may coat the walls of the interstitial space, lowering the transfer of heat from exhaust gases to intake air flowing through the interstitial space, and reducing the temperature of air leaked into the intake manifold from the aspirator.

In this way, heating of motive flow through an intake aspirator can be used to control a motive mass flow rate, without requiring a dedicated aspirator shut-off valve. By compensating a throttle position (e.g., a throttle angle) based on an estimated flow rate and temperature of motive flow received in an engine intake manifold, downstream of the throttle through an un-valved aspirator, vacuum may be drawn while reducing airflow errors. By decreasing the mass flow rate of motive air through the aspirator via heated motive air, the throttle position can be maintained at a slightly open position during a wider range of engine idle conditions, instead of at a fully closed position. As a result, engine idle speeds can be maintained with reduced reliance on spark timing retard, thereby improving engine fuel economy. By heating the engine intake by drawing air into the intake manifold via the interstitial space of the exhaust manifold, and through an un-valved aspirator, intake stroke pumping work is reduced, and engine combustion stability is improved. Furthermore, the need for PCV heat or throttle heat is reduced, and exhaust CO emissions are also reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   flowing intake air, heated upon passage through an interstitial space of a double wall exhaust manifold, through an aspirator coupled to an engine vacuum consumption device to reduce motive mass flow rate at the aspirator as exhaust temperature increases;
   comparing an actual temperature of an engine intake manifold aircharge to an expected temperature; and
   indicating plugging of the interstitial space based on the comparison.

2. The method of claim 1, wherein the aspirator is not coupled to an aspirator shut-off valve, and wherein the heated intake air flows through the aspirator en route from the interstitial space to an engine intake air, downstream of a throttle, without flowing through any other devices between the interstitial space and the engine intake.

3. The method of claim 1, further comprising, drawing vacuum at a neck of the aspirator and applying the drawn vacuum to the vacuum consumption device.

4. The method of claim 3, wherein the vacuum consumption device is a brake booster.

5. The method of claim 1, wherein flowing the intake air further includes flowing from upstream of an intake throttle to an intake manifold, downstream of the intake throttle, via the aspirator.

6. The method of claim 5, wherein flowing the intake air from upstream of the intake throttle further includes flowing from one of upstream of an intake compressor, when the engine is not boosted, and downstream of a charge air cooler, when the engine is boosted.

7. The method of claim 6, further comprising, during engine idling, feed-forward adjusting the intake throttle based on an amount of aspirator mass flow rate, the aspirator mass flow rate based on a temperature of motive flow through the aspirator.

8. The method of claim 7, wherein the temperature of motive flow through the aspirator is inferred based on exhaust temperature.

9. The method of claim 8, wherein adjusting the intake throttle further includes, moving the intake throttle towards a more closed position as the temperature of the motive flow through the aspirator decreases, and moving the intake throttle towards a more open position as the temperature of the motive flow through the aspirator increases.

10. The method of claim 9, further comprising, after the intake throttle reaches a fully closed position, retarding spark timing responsive to an amount of aspirator leakage flow while maintaining the intake throttle at the fully closed position.

11. The method of claim 9, further comprising, feedback adjusting the intake throttle based on an expected intake airflow relative to an estimated intake airflow.

12. A method for an engine, comprising:
    flowing intake air through an interstitial space of a double wall exhaust manifold, and then through an aspirator before delivering the intake air to an engine intake manifold; and
    during a first idling condition, when exhaust temperature is higher, feed-forward adjusting an intake throttle to a more open position during the flowing; and
    during a second idling condition, when the exhaust temperature is lower, feed-forward adjusting the intake throttle to a more closed position during the flowing;
    comparing an actual temperature of an engine intake manifold aircharge to an expected temperature; and
    indicating plugging of the interstitial space based on the comparison.

13. The method of claim 12, wherein during the first idling condition, a temperature of motive flow through the aspirator is hotter, and wherein during the second idling condition, the temperature of motive flow through the aspirator is cooler.

14. The method of claim 13, wherein during the first idling condition, an aspirator mass flow rate is lower and wherein during the second idling condition, the aspirator mass flow rate is higher.

15. The method of claim 12, wherein the aspirator is not a valved aspirator, the method further comprising, during both first and second idling conditions, drawing vacuum at a neck of the aspirator and applying the drawn vacuum to a vacuum consumption device, wherein the vacuum consumption device is a brake booster, a fuel vapor canister, or a vacuum actuated valve.

16. A system for an engine, comprising:
    an engine intake manifold;
    an intake throttle;
    a compressor;
    an exhaust manifold having a double wall exterior defining an interstitial space;
    a conduit coupling the interstitial space to the intake manifold downstream of the compressor and the intake throttle;
    an un-valved aspirator positioned in the conduit, the aspirator coupled to a vacuum consumption device; and
    a controller configured with computer readable instructions stored on non-transitory memory to:
    during an engine cold-start,
    draw intake air into the interstitial space from upstream of the intake throttle;
    flow intake air heated upon passage through the interstitial space through the aspirator;
    draw a vacuum at the aspirator; and adjust a position of the intake throttle based on an amount of airflow through the aspirator, the amount of airflow estimated based on exhaust temperature during the engine cold-start;
    wherein the system further includes a temperature sensor coupled to the intake manifold, downstream of the intake throttle, and wherein the controller includes further instructions for:
    comparing an actual temperature of an engine intake manifold aircharge to an expected temperature; and
    indicating plugging of the interstitial space based on the comparison.

17. The system of claim 16, wherein the controller includes further instructions for, moving the intake throttle towards a more open position as the amount of airflow through the aspirator decreases, wherein the amount of airflow through the aspirator decreases as the exhaust temperature increases.

18. The system of claim 16, wherein the controller includes further instructions for, applying the vacuum drawn at the aspirator to the vacuum consumption device, wherein the vacuum consumption device is a brake booster.

19. The system of claim 16, wherein the actual temperature is based on an output of the temperature sensor, wherein the expected temperature is based on an aspirator mass flow rate, and wherein the indicating of plugging of the interstitial space further includes indicating that the interstitial space is plugged in response to the actual temperature being lower than the expected temperature by more than a threshold amount.

\* \* \* \* \*